(12) United States Patent
Le Gonidec et al.

(10) Patent No.: US 9,779,358 B2
(45) Date of Patent: Oct. 3, 2017

(54) INFORMATION PROCESSING SYSTEM AND METHOD FOR MONITORING A COMPLEX SYSTEM

(71) Applicant: SNECMA, Paris (FR)

(72) Inventors: Serge Le Gonidec, Vernon (FR); Dimitri Malikov, Paris (FR); Ion Berechet, Vincennes (FR); Stefan Berechet, Fontenay Sous Bois (FR)

(73) Assignee: SNECMA, Paris (FR)

( * ) Notice: Subject to any disclaimer, the term of this patent is extended or adjusted under 35 U.S.C. 154(b) by 380 days.

(21) Appl. No.: 14/404,039

(22) PCT Filed: May 27, 2013

(86) PCT No.: PCT/FR2013/051168
§ 371 (c)(1),
(2) Date: Nov. 26, 2014

(87) PCT Pub. No.: WO2013/178922
PCT Pub. Date: Dec. 5, 2013

(65) Prior Publication Data
US 2015/0154505 A1 Jun. 4, 2015

(30) Foreign Application Priority Data
May 28, 2012 (FR) .................................... 12 54901

(51) Int. Cl.
*G06F 9/44* (2006.01)
*G06N 7/02* (2006.01)
(Continued)

(52) U.S. Cl.
CPC .......... *G06N 7/02* (2013.01); *G05B 23/0278* (2013.01); *G06N 5/048* (2013.01)

(58) Field of Classification Search
USPC ........................................................ 706/52
See application file for complete search history.

(56) References Cited

U.S. PATENT DOCUMENTS 6,757,668 B1 6/2004 Goebel et al.
8,005,554 B2 * 8/2011 Le Gonidec .............. F02C 9/26
700/55

(Continued)

FOREIGN PATENT DOCUMENTS

WO 2011 104466 9/2011

OTHER PUBLICATIONS

Fuzzy Logic Based Prosumer Agent in a Modular Smart Grid Prosumer Architecture Chen-Wei Yang; Kashif Gulzar; Seppo Sierla; Valeriy Vyatkin 2015 IEEE Trustcom/BigDataSE/ISPA Year: 2015, vol. 3 pp. 261-268, DOI: 10.1109/Trustcom.2015.642 IEEE Conference Publications.*

(Continued)

Primary Examiner — Michael B Holmes
(74) Attorney, Agent, or Firm — Oblon, McClelland, Maier & Neustadt, L.L.P.

(57) ABSTRACT

A data processor system for monitoring a complex system, the processor system configured to receive a plurality of pieces of state information and to merge at least the pieces of state information into a piece of failure information, at least one of the pieces of state information being associated with a confidence flag, and the piece of failure information also being associated with a confidence flag. The system performs the merging by implementing a fuzzy logic technique to produce the piece of failure information while taking account of the respective confidence flag of the pieces of state information and to produce the confidence flag associated with the failure information.

9 Claims, 8 Drawing Sheets

(51) Int. Cl.
*G06N 7/06* (2006.01)
*G05B 23/02* (2006.01)
*G06N 5/04* (2006.01)

(56) References Cited

U.S. PATENT DOCUMENTS

| | | | | |
|---|---|---|---|---|
| 8,005,649 | B2* | 8/2011 | Bornert | G01D 3/036 702/104 |
| 8,345,960 | B2* | 1/2013 | Berginc | G01B 11/25 382/154 |
| 8,364,374 | B2* | 1/2013 | Le Gonidec | F02K 9/56 60/207 |
| 8,377,602 | B2* | 2/2013 | Le Gonidec | H01M 8/04007 429/434 |
| 8,886,582 | B2* | 11/2014 | Le Gonidec | F02K 9/96 706/45 |
| 8,892,478 | B1* | 11/2014 | Bickford | G06N 99/005 374/1 |
| 9,037,380 | B2* | 5/2015 | Le Gonidec | F02K 9/56 701/99 |
| 9,135,747 | B2* | 9/2015 | Berechet | G06T 17/05 |
| 9,528,470 | B2* | 12/2016 | Kernilis | F02K 9/566 |
| 2005/0021212 | A1* | 1/2005 | Gayme | G06N 5/048 701/99 |
| 2005/0210337 | A1 | 9/2005 | Chester et al. | |
| 2009/0037772 | A1 | 2/2009 | Wegerich et al. | |
| 2009/0043405 | A1 | 2/2009 | Chester et al. | |
| 2013/0046713 | A1 | 2/2013 | Le Gonidec et al. | |

OTHER PUBLICATIONS

Predicting breast cancer survivability using fuzzy decision trees for personalized healthcare Muhammad Umer Khan; Jong Pill Choi; Hyunjung Shin; Minkoo Kim 2008 30th Annual International Conference of the IEEE Engineering in Medicine and Biology Society Year: 2008 pp. 5148-5151, DOI: 10.1109/IEMBS.2008. 4650373 IEEE Conference Publications.*

FLAR: An Adaptive Fuzzy Routing Algorithm for Communications Networks Using Mobile Ants Seyed Javad Mirabecini; Mohammad Teshnehlab; A. M. Rahmani 2007 International Conference on Convergence Information Technology (ICCIT 2007) Year: 2007 pp. 1308-1315, DOI: 10.1109/ICCIT.2007.26 IEEE Conference Publications.*

A Hybrid Method in Driver and Multisensor Data Fusion, Using a Fuzzy Logic Supervisor for Vehicle Intelligence Mandi Rezaei Ghahroudi; Alireza Fasih 2007 International Conference on Sensor Technologies and Applications (SENSORCOMM 2007) Year: 2007 pp. 393-398, DOI: 10.1109/SENSORCOMM.2007.4394953 IEEE.*

International Search Report dated Aug. 19, 2013 in PCT/FR13/ 051168 Filed May 27, 2013.

* cited by examiner

| Correspondance table | Flag 1 | Flag 2 | ..... | Flag n |
|---|---|---|---|---|
| Failure 1 | 1 | 1 | Value ! | 0 |
| Failure 2 | 0 | 1 | Value ! | 1 |
| ..... | Value ! | Value ! | Value ! | |
| Failure m | Value ! | Value ! | Value ! | Value ! |

| | | | | | | | | | |
|---|---|---|---|---|---|---|---|---|---|
| FLAG 1 | "-1" | -1 | val | val | val | 0 | 0 | 0 | 0 | 0 |
| | "0" | 0 | val | val | val | 0 | 0 | 0 | 0 | 0 |
| | "1" | 0 | val | val | val | 1.0 | 0 | 0 | 0 | 0 |
| | "2" | 0 | val | val | val | 0 | 0.9 | 0.9 | 1.0 | 0 |
| | "3" | 0 | val | val | val | 0 | 0 | 0 | 0 | 0.8 |

+

| | | | | | | | | | |
|---|---|---|---|---|---|---|---|---|---|
| FLAG 2 | "-1" | 0 | val | val | val | 0 | 0 | 0 | 0 | 0 |
| | "0" | 1 | val | val | val | 0 | 0 | 0 | 0 | 0 |
| | "1" | 0 | val | val | val | 0 | 0 | 0 | 0 | 0 |
| | "2" | 0 | val | val | val | 0 | 0 | 0 | 0 | 0 |
| | "3" | 0 | val | val | val | 0.6 | 0.7 | 0.9 | 0.9 | 1.0 |

=

| | | | | | | | | | |
|---|---|---|---|---|---|---|---|---|---|
| Merged flag | "-1" | -1 | val | val | val | 0 | 0 | 0 | 0 | 0 |
| | "0" | 0 | val | val | val | 0 | 0 | 0 | 0 | 0 |
| | "1" | 0 | val | val | val | 0 | 0 | 0 | 0 | 0 |
| | "2" | 0 | val | val | val | 0.8 | 0 | 0 | 0 | 0 |
| | "3" | 0 | val | val | val | 0 | 0.8 | 0.9 | 0.9 | 1.0 |

Time →

| | | | | | | | | | |
|---|---|---|---|---|---|---|---|---|---|
| FLAG 1 | "-1" | -1 | val | val | val | 0 | 0 | 0 | 0 | 0 |
| | "0" | 0 | val | val | val | 0.2 | 0 | 0 | 0 | 0 |
| | "1" | 0 | val | val | val | 0.8 | 0.3 | 0 | 0 | 0 |
| | "2" | 0 | val | val | val | 0 | 0.7 | 0.9 | 1.0 | 1.0 |
| | "3" | 0 | val | val | val | 0 | 0 | 0.1 | 0.9 | 0.8 |
+
| | | | | | | | | | |
|---|---|---|---|---|---|---|---|---|---|
| FLAG 2 | "-1" | 0 | val | val | val | 0 | 0 | 0 | 0 | 0 |
| | "0" | 1 | val | val | val | 0 | 0 | 0 | 0 | 0 |
| | "1" | 0 | val | val | val | 0 | 0 | 0 | 0 | 0 |
| | "2" | 0 | val | val | val | 0 | 0 | 0 | 0 | 0 |
| | "3" | 0 | val | val | val | 0.6 | 0.7 | 0.9 | 0.9 | 1.0 |
=
| | | | | | | | | | |
|---|---|---|---|---|---|---|---|---|---|
| Merged flag | "-1" | -1 | val | val | val | 0 | 0 | 0 | 0 | 0 |
| | "0" | 0 | val | val | val | 0 | 0 | 0 | 0 | 0 |
| | "1" | 0 | val | val | val | 0.1 | 0 | 0 | 0 | 0 |
| | "2" | 0 | val | val | val | 0.8 | 0.6 | 0.4 | 0.2 | 0.1 |
| | "3" | 0 | val | val | val | 0 | 0.2 | 0.5 | 0.7 | 0.9 |
Time →
FIG.15
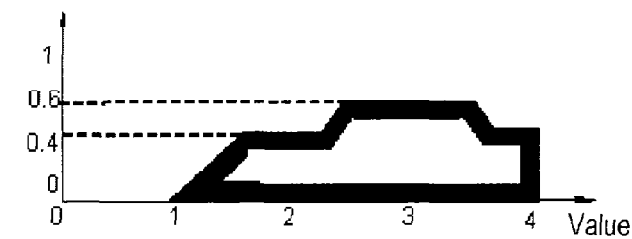
(5) Defuzzyfication
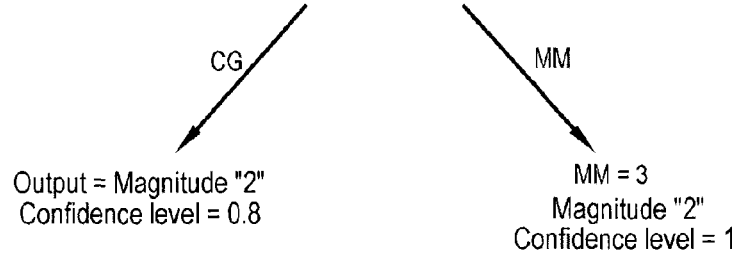
Output = Magnitude "2"
Confidence level = 0.8
MM = 3
Magnitude "2"
Confidence level = 1
FIG.16

INFORMATION PROCESSING SYSTEM AND METHOD FOR MONITORING A COMPLEX SYSTEM

TECHNICAL FIELD AND PRIOR ART

The invention lies in the field of systems and methods for detecting and analyzing failure signals in a complex system, such as for example a rocket engine.

In this field, fault indicators known as "flags" are activated whenever a sensor or a set of sensors located in a given location of the complex system and measuring one or more physical magnitudes detects a departure from a reference value, possibly after processing the measured data.

Such fault flags may be indicative of a suspected fault (or failure) relating to a component, a subsystem, a complete system, or sometimes a sensor. It is known how to associate fault flags or sets of fault flags with failures, which are diagnoses for deciding to take action (by a human or automatically). Thus, by way of example in a rocket engine, one fault flag may relate to a high level of vibration in a turbine, and a second fault flag may relate to low efficiency of the turbine. Under such circumstances, both of those flags in combination may be associated with the loss of a turbine blade. The links between fault flags and failures are established with the help of matrices that are arranged in compliance with a tree structure for the system, which matrices may be developed subsystem by subsystem.

Document WO 2011/104466 further discloses associating a confidence level with each fault flag and, starting from received raw failure messages, generating one or more consolidated messages each including a confidence level, by merging the information from raw fault messages, regardless of whether the messages are associated with component failures, subsystem failures, complete system failures, or sensor failures.

Such merging of fault flags makes high-level decision-taking possible. The flag for merging may constitute information that is redundant, complementary, consistent or contradictory, symbolic, or digital, and they may have respective confidence levels representative of their imperfections (inaccuracies, uncertainties, incompleteness).

Merging may be performed in an architecture that is centralized or distributed, or indeed in an architecture that is hierarchical. Centralized functions may coexist with distributed functions.

SUMMARY OF THE INVENTION

The invention seeks to perform such merging using symbolic methods derived from artificial intelligence. Specifically, the invention provides a data processor system for monitoring a complex system, the processor system being configured to receive a plurality of pieces of state information and to merge at least said pieces of state information into a piece of failure information, at least one of said pieces of state information being associated with a confidence flag, and the piece of failure information likewise being associated with a confidence flag, the system being characterized in that merging is performed by implementing a fuzzy logic technique in order to produce the piece of failure information while taking account of the respective confidence flags of the pieces of state information and in order to produce the confidence flag associated with the failure information.

In various embodiments, exact rules are used for combining the pieces of state information, or fuzzy rules are used for combining the pieces of state information, the state information is subjected to fuzzyfication with an exact belonging function, a fuzzy belonging function, a belonging function in which one class is strengthened relative to the others, or a belonging function in which a magnitude is cross-tabulated with a confidence level. It is also possible for inference to be performed using Mamdani's method or Larsen's method, the rules are aggregated with the maximum operator or the minimum operator, defuzzyfication is performed using the method of averaging the maximums or the center of gravity method.

The pieces of state information may be received in state messages including the identity of a subsystem or of a component, and possibly a time stamp.

The invention also provides a data processing method for monitoring a complex system, the method implying receiving pieces of state information and merging at least one of said pieces of state information into a piece of failure information, at least one of said pieces of state information being associated with a confidence flag, and the piece of failure information also being associated with a confidence flag, the method being characterized in that merging is performed by implementing a fuzzy logic technique in order to produce a piece of failure information while taking account of the respective confidence flags of the pieces of state information and in order to produce the confidence flag associated with the piece of failure information.

BRIEF DESCRIPTION OF THE FIGURES

The invention is described below with reference to the following figures.

FIG. 12 shows a second particular aspect of an embodiment of the invention, namely the application of merging rules.

FIGS. 13 to 15 each show an aspect corresponding to another embodiment.

FIG. 16 shows a third particular aspect in two embodiments of the invention, namely defuzzyfication.

DETAILED DESCRIPTION OF THE INVENTION

There follows a detailed description of certain aspects of the invention.

Figure 1:
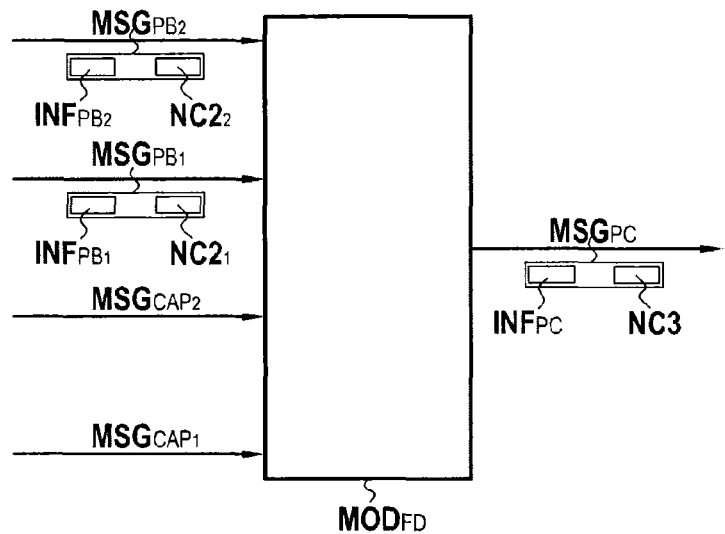
FIG. 1 is a general diagram of how the invention is performed.

FIG. 1 shows a data merge module $MOD_{FD}$. It receives one or more state messages as input (which messages correspond to the raw failure messages described in WO 2011/104466), there being two such messages in this example that are referenced $MSG_{PB1}$ and $MSG_{PB2}$. Each of these messages includes a piece of state information $INF_{PB}$ and a confidence level NC2 (the digit 2 here indicating that this is a confidence level that is already partially consolidated, being derived in one manner or another from a primitive confidence level). In FIG. 1, the references $INF_{PB}$ and NC2 are followed by respective indices referring to the number of the state message to which they are attached.

The data merge modules $MOD_{FD}$ also receive messages relating to the states of sensors $MSG_{CAP}$, this example having such messages that are referenced $MSG_{CAP1}$ and $MSG_{CAP2}$, each of which is associated with a confidence level NC1.

In certain simple situations, the numbers of sensor failure messages and of state messages are identical and each sensor failure message is associated with a state message triggered by a process involving the sensor for which the failure state is signaled by the sensor failure message.

The module $MOD_{FD}$ outputs a consolidated failure message comprising consolidated failure information $INF_{PC}$ and a consolidated confidence level NC3, where the index 3 indicates an additional consolidation step relative to confidence level NC2.

In certain simple situations, the module $MOD_{FD}$ produces a single message $MSG_{PC}$, however it could produce several such messages, and preferably a number of such messages that is smaller than the number of state messages $MSG_{PB}$ that it receives as input.

Figure 2:
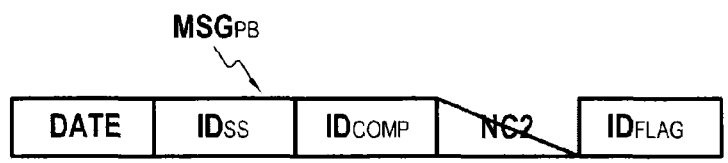
FIGS. 2 to 4 show details of the FIG. 1 diagram.

The structure of a message $MSG_{PB}$ is shown in FIG. 2. Such a message contains, e.g. in sequential manner: a time stamp DATE; a subsystem identifier $ID_{SS}$; a component identifier $ID_{COMP}$; the failure being specified by the message as relating to the reference subsystem or to the reference component; a confidence level NC2 as mentioned above; and a fault flag identifier $ID_{FLAG}$. The identifiers $ID_{SS}$, $ID_{COMP}$, and $ID_{FLAG}$ are selected in application of a predetermined convention. The pieces of information DATE, $ID_{SS}$, $ID_{COMP}$, and $ID_{FLAG}$ constitute the information $INF_{PB}$.

Figure 3:
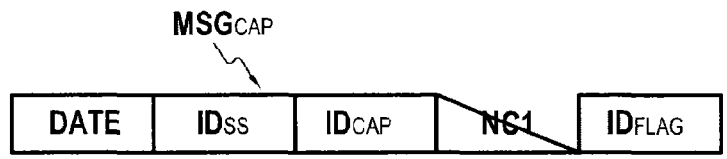

The structure of a message $MSG_{CAP}$ is shown in FIG. 3. Such a message contains, e.g. in sequential manner: a time stamp; a subsystem identifier $ID_{SS}$; a sensor identifier $ID_{CAP}$; a confidence level NC1 (the numeral 1 indicating here that it is a primitive value, but it could be a value that has been partially consolidated in one way or another); and a fault flag identifier $ID_{FLAG}$. The identifier $ID_{CAP}$ is selected in application of a predetermined convention.

Figure 4:
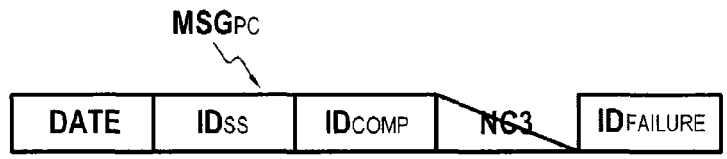

The structure of a message $MSG_{PC}$ is shown in FIG. 4. Such a message contains, e.g. in sequential manner: a time stamp DATE; a subsystem identifier $ID_{SS}$; a component identifier $ID_{COMP}$; the above-mentioned confidence level; and a failure identifier $ID_{FAILURE}$. The identifiers $ID_{SS}$, $ID_{COMP}$, and $ID_{FAILURE}$ are selected in application of a predetermined convention. The pieces of information DATE, $ID_{SS}$, $ID_{COMP}$, and $ID_{FAILURE}$ constitute the information $INF_{PC}$.

Figure 5:
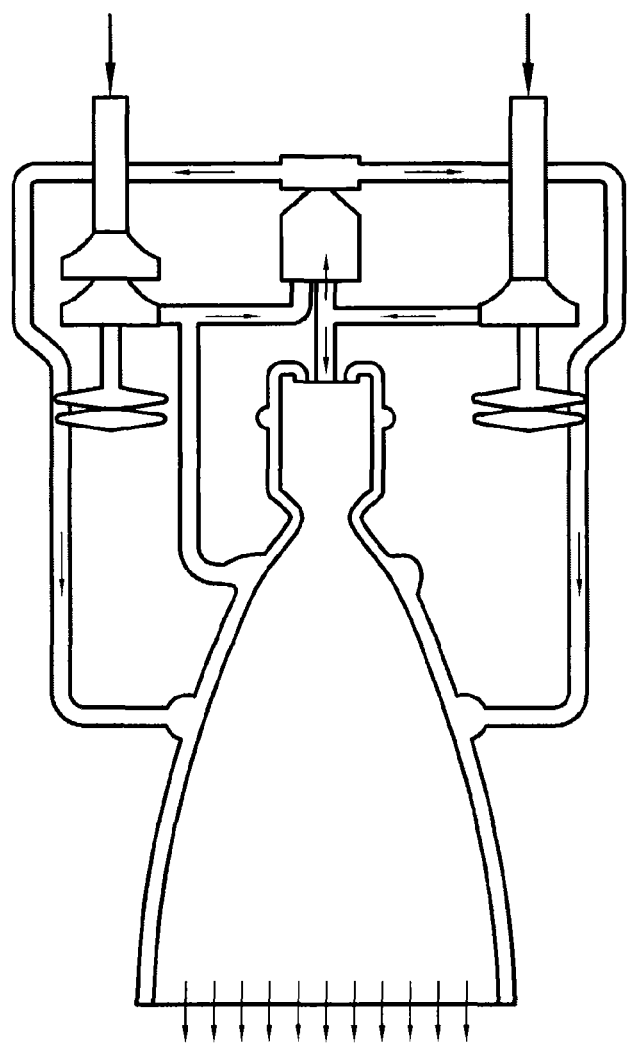
FIG. 5 shows a particular example of an application of the invention.
Figure 5:
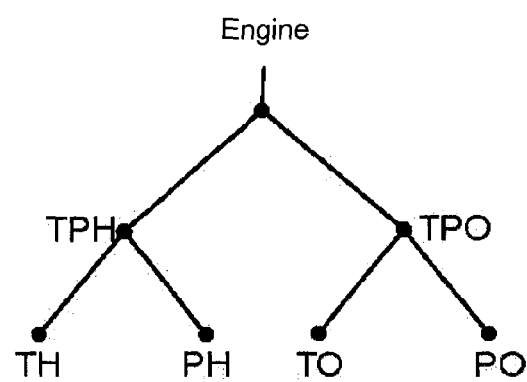

FIG. 5 shows a concrete example of a complex system monitored by various sensors in order to detect and diagnose failures. It is a rocket engine operating on liquid oxygen and hydrogen and producing hot gas. Sensors monitor the hydrogen turbine TH, the hydrogen pump PH, the oxygen turbine TO, and the oxygen pump PO. Calculation and information processing functions generate state messages and sensor failure messages. The state messages coming from the hydrogen turbine and from the hydrogen pump are merged in a module $MOD_{FD}$ in order to form a consolidated message relating to the hydrogen turbine and pump assembly TPH. In parallel, state messages coming from the oxygen turbine and the oxygen pump are merged in a module $MOD_{FD}$ in order to form a consolidated message relating to the oxygen turbine and pump assembly TPO. Thereafter, the consolidated messages coming from the assembly TPH and the assembly TPO are merged again in a module $MOD_{FD}$ in order to form a consolidated message relating to the entire engine.

Fault flags may be activated with various magnitude levels, in an exact manner or in a fuzzy manner, as described in the following two tables, showing in succession a flag that has been activated in an exact manner and a flag that has been activated in a fuzzy manner.

| Magnitude 2 "severe malfunction" with confidence level 0.7 | | | | | | |
|---|---|---|---|---|---|---|
| "2" | "Severe malfunction" Magnitude 2 with confidence level 0.7 & Magnitude 3 with confidence level 0.3 | 0 | 0 | 0 | 0.7 | 0 |
| "2" | "Severe malfunction" | 0 | 0 | 0 | 0.7 | 0 |
| "3" | "Failure" | 0 | 0 | 0 | 0 | 0.3 |

Figures 6, 7:
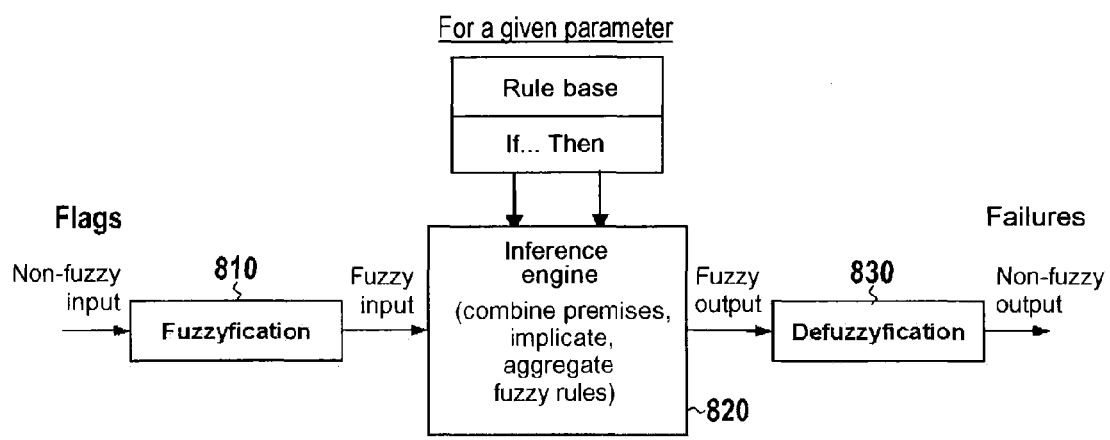
FIG. 6 shows second means used in certain embodiments of the invention.
FIG. 7 shows third means used in certain embodiments of the invention.

FIG. 6 shows a correspondence table $G_{CRF}$ that is also used in the module $MOD_{FD}$. The table $G_{CRF}$ associates pairs constituted by one or more failures and one or more state flags. To obtain failure information, the state flags mentioned in the table in register with the failure are merged after being weighted by the coefficients given in the table. In a particular embodiment, the flags are merged in pairs, beginning with the flags numbered 1 and 2, then merging the result of this merger with the flag 3, and then merging the result of this additional merger with the flag 4, and so on, until all of the flags having a non-zero weighting coefficient for the failure in question have been used up. Other embodiments are possible. The end result is a failure flag that may indicate that there is no failure or that this failure is present, with a certain magnitude and with a certain confidence level.

FIG. 7 shows a fuzzy logic system used in the module $MOD_{FD}$. It comprises a fuzzyfication module 810 generating a fuzzy input from a nonfuzzy input, an inference engine 820 generating a fuzzy output from the fuzzy input generated by the fuzzyfication module 810, and finally a defuzzyfication 830 generating a nonfuzzy output from the fuzzy output generated by the inference engine 820. The inference engine 820 uses a rule base, combinations of premises, implications, and aggregates of fuzzy rules.

The fuzzy logic system constituted by the modules 810, 820, and 830 acts for a given parameter of the monitored complex system to process a certain number of input fault flags (E) that are obtained in nonfuzzy form. This nonfuzzy form may be an instantaneous real form independent of earlier states or it may be a virtual or dynamic form including earlier states of the flag in one manner or another. Thus, for a given instant, in the first situation the flag may essentially comprise a single one-off message, or in the second situation it may be constituted by a time-varying signal that possesses a form of continuity. Naturally, a combination of both situations is possible. In a variant, the nonfuzzy form is obtained in the correspondence table $G_{CRF}$ of FIG. 6, on the basis of different messages $MSG_{PB}$ and $MSG_{CAP}$.

The nonfuzzy value of the fault flag is a pair comprising a magnitude and a confidence level pair, with the magnitude (malfunction level) being selected for example from among the values "−1", "0", "1", "2", and "3" (e.g. corresponding respectively to "no information", "all's well", "minor malfunction", "severe malfunction", and "failure"), and the confidence level may lie in the continuous range [0, 1], where 0 is minimum confidence and 1 is maximum confidence.

Figure 8:
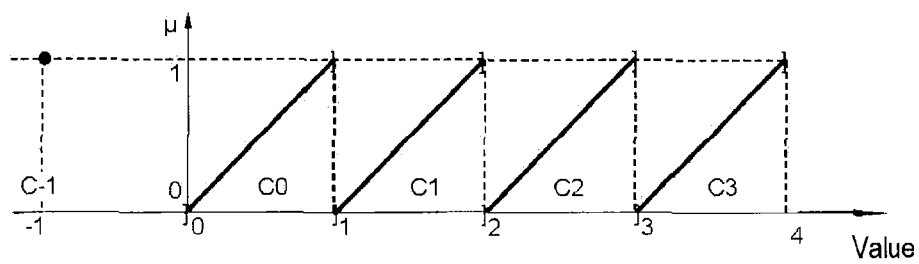
FIG. 8 shows a first particular aspect of an embodiment of the invention, namely the fuzzyfication step.

FIG. 8 shows an exact belonging function μ for the fuzzy values of fault flags. The fuzzy value of the fault flag as produced by the fuzzyfication module 810 is represented graphically in the figure. The classes of variables C−1, C0, C1 to C3 are also shown. They do not overlap. The values of the classes are constituted by segments that are open to the left and closed to the right (except for the class −1) in compliance with the following table (CL designating confidence level).

| Fuzzy class | Value (magnitude + CL for CL ≥ 0 and −1 for CL = −1) | |
|---|---|---|
| C−1 | Value = −1 | with Y = −1 |
| C0 | Value = ]0, 1] | with Y = ]0, 1] |
| C1 | Value = ]1, 2] | with Y = ]0, 1] |
| C2 | Value = ]2, 3] | with Y = ]0, 1] |
| C3 | Value = ]3, 4] | with Y = ]0, 1 ] |

Figure 9:
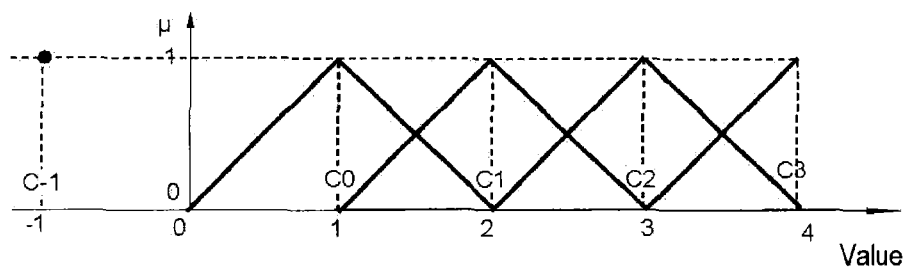
FIGS. 9 to 11 each show an aspect corresponding to another embodiment.

FIG. 9 shows a fuzzy belonging function μ for the fuzzy values of the fault flags. The variable classes C−1, C0, C1 to C3 are also shown. The values of the classes are constituted by segments that are open to the left and closed to the right. The classes C0 to C3 overlap in pairs in compliance with the following table.

| Fuzzy class | Value (magnitude + CL for CL ≥ 0 and −1 for CL = −1) | |
|---|---|---|
| C−1 | Value = −1 | with Y = −1 |
| C0 | Value = ]0, 1, 2] | with Y = ]0, 1, 0] |
| C1 | Value = ]1, 2, 3] | with Y = ]0, 1, 0] |
| C2 | Value = ]2, 3, 4] | with Y = ]0, 1, 0] |
| C3 | Value = ]3, 4] | with Y = ]0, 1] |

Figure 10:
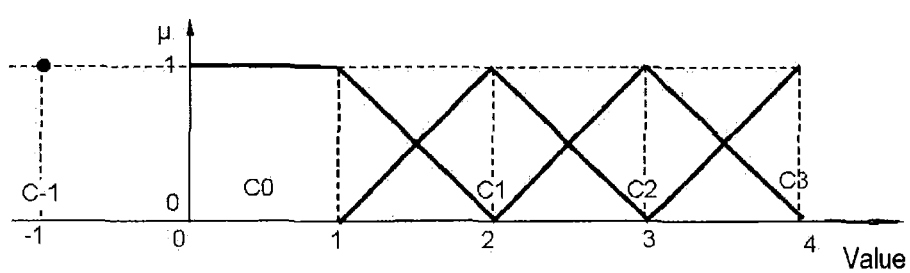

FIG. 10 shows a fuzzy belonging function μ based on the above function but with strengthening of class C0, in compliance with the following table.

| Fuzzy class | Value (magnitude + CL for CL ≥ 0 and −1 for CL = −1) | |
|---|---|---|
| C−1 | Value = −1 | with Y = [1] |
| C0 | Value = ]0, 1, 2] | with Y = ]1, 1, 0] |
| C1 | Value = ]1, 2, 3] | with Y = ]0, 1, 0] |
| C2 | Value = ]2, 3, 4] | with Y = ]0, 1, 0] |
| C3 | Value = ]3, 4] | with Y = ]0, 1] |

Figure 11:
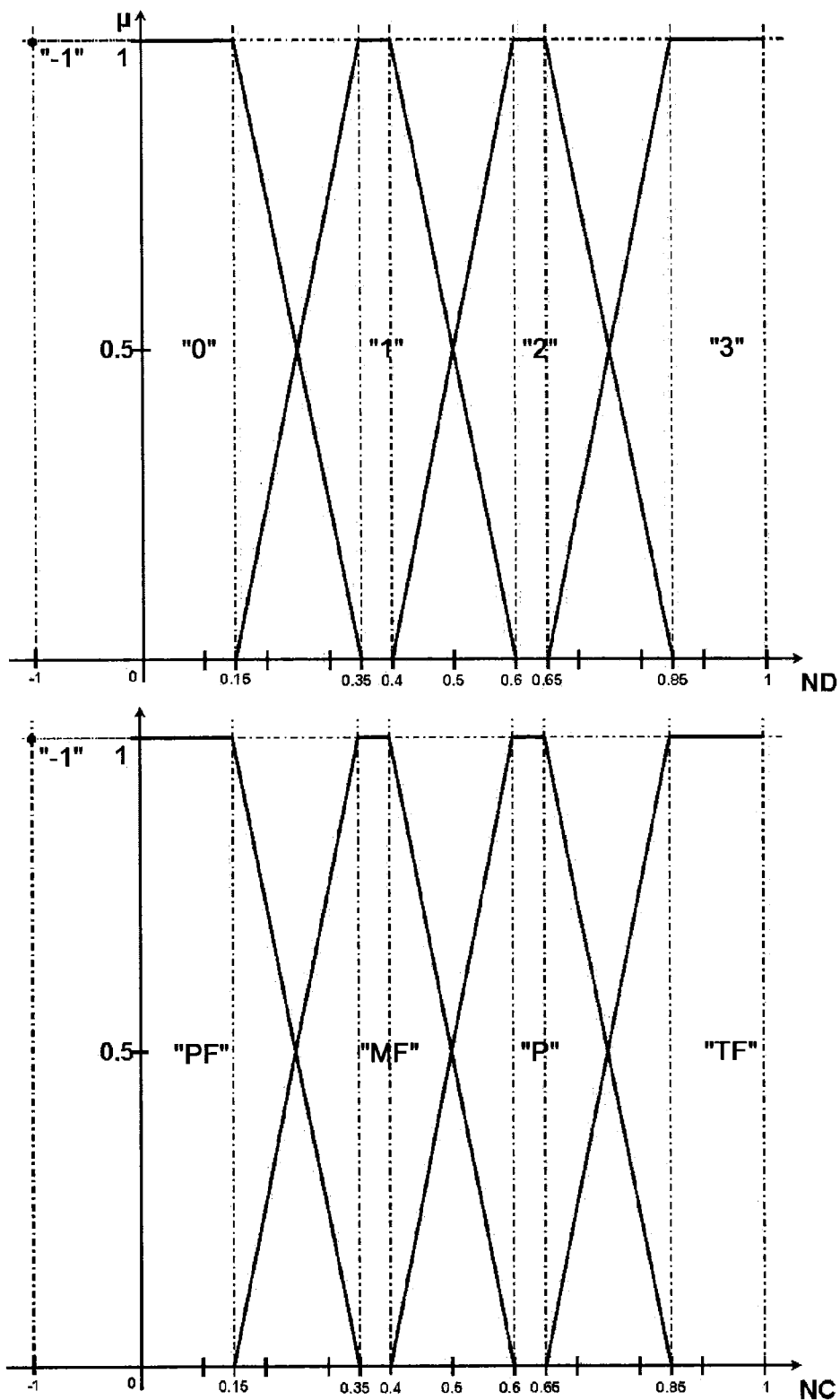

FIG. 11 shows a fuzzy belonging function μ based on the function of FIG. 9 and obtained by cross-tabulating the magnitude (malfunction level) with the confidence level (cross-tabulated fuzzyfication between ND and NC) in compliance with the following tables.

| Magnitude (ND) | Fuzzy class | Value |
|---|---|---|
| "No information" | "−1" | ND = −1 |
| "All's well" | "0" | ND = [0, 0.15, 0.35] with Y = [1, 1, 0] |
| "Minor malfunction" | "1" | ND = [0.15, 0.35, 0.4, 0.6] with Y = ]0, 1, 1, 0] |
| "Severe malfunction" | "1" | ND = [0.4, 0.6, 0.65, 0.85] with Y= ]0, 1, 1, 0] |
| "Failure" | "3" | ND = [0.65, 0.85, 1] with Y = ]0, 1, 1] |

| Confidence level (NC) | Fuzzy class | Value |
|---|---|---|
| "No information" | "−1" | NC = −1 |
| "Not very reliable" | "PF" | NC = [0, 0.15, 0.35] with Y = [1, 1, 0] |
| "Fairly reliable" | "MF" | NC = [0.15, 0.35, 0.4, 0.6] with Y = ]0, 1, 1, 0] |
| "Reliable" | "F" | NC = [0.4, 0.6, 0.65, 0.85] with Y = ]0, 1, 1, 0] |
| "Very reliable" | "TF" | NC = [0.65, 0.85, 1] with Y = ]0, 1, 1] |

For the inference performed by the engine 820, it is possible to use Mamdani's method and Larsen's method.

Use is made of a rules base, derived from failure modes and effects analysis (FMEA), together with feedback information from experience. Examples of rules used in this way are as follows: if only one fault flag is activated, then the merge flag is identical to the input flag; a plurality of activated fault flags may be merged; the combining rules may contain "ANDs", "ORs", or both. An example of exact rules is given in the following table.

| | Merged | Flag 1 | | | | |
|---|---|---|---|---|---|---|
| | Flag | "−1" | "0" | "1" | "2" | "3" |
| Flag 2 | "−1" | "−1" | "−1" | "−1" | "−1" | "−1" |
| | "0" | "−1" | "0" | "0" | "1" | "1" |
| | "1" | "−1" | "0" | "1" | "1" | "2" |
| | "2" | "−1" | "1" | "1" | "2" | "3" |
| | "3" | "−1" | "1" | "2" | "3" | "3" |

If the rules that are activated simultaneously are associated by an OR operator, the rules may be aggregated by the maximum operator:

$$\mu_B(y) = \text{MAX}[\mu_{B_i}(y)] \; i \in \{\text{indices of the activated rules}\}$$

and if the rules that are activated simultaneously are associated by an AND operator, aggregating may be performed by the minimum operator $$\mu_B(y) = \text{MAX}[\mu_{B_i}(y)] \; i \in \{\text{indices of the activated rules}\}$$

Figures 12, 13:
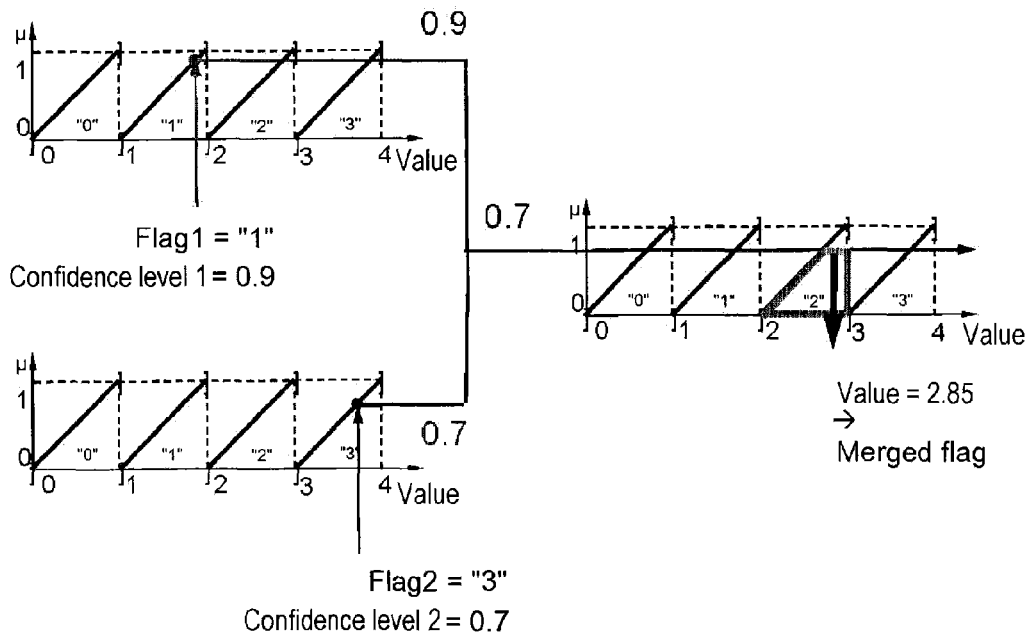

FIGS. 12 and 13 show an embodiment of fault flag merging performed by the inference engine 820 for an exact belonging function (FIG. 8), and exact combination rules such as those shown in the table above. FIG. 12 shows an example in which, at the instant in question, a first flag has a magnitude 3 with a confidence level of 0.8, and a second flag has a magnitude 3 with a confidence level of 1. The exact rules given in the above table give a merging result which constitutes a failure flag of magnitude 3 with a confidence level of 1.

Another example is given in FIG. 13 with a flag of magnitude 1 and a confidence level of 0.9, i.e. a fuzzy value of 1.9, and a second flag of magnitude 3 with a confidence level equal to 0.7 and a fuzzy value of 3.7. The fuzzy value that is produced is 2.85, which is obtained by averaging 1.9 and 3.7. The method used is Mamdani's method with the Min operator for combining the premises and for rule implication.

Figure 14:
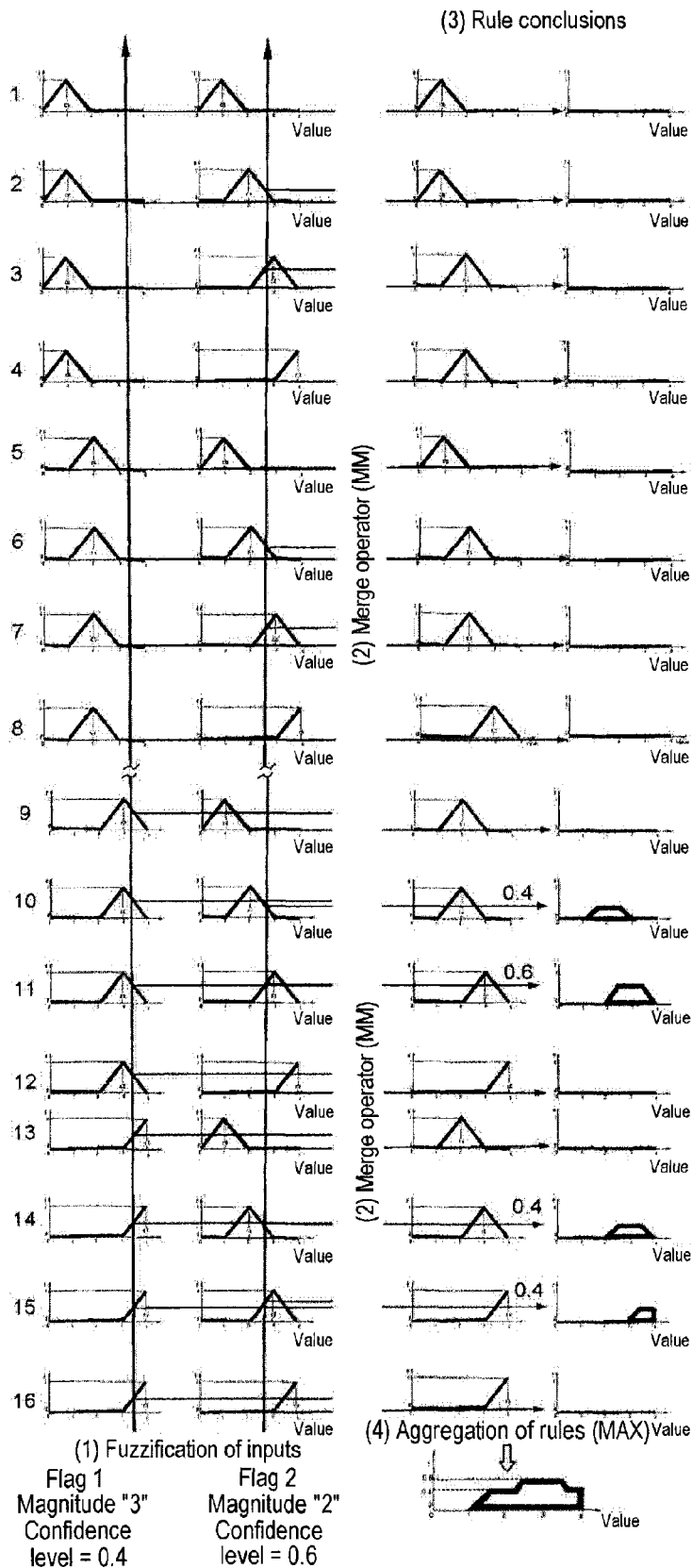

FIG. 14 shows an example of merging fault flags performed by the inference engine 820 when there is a fuzzy belonging function (as shown in FIG. 9) together with the exact rules of the above table. The merging process is used for all of the rules except rules having a magnitude of −1.

The example described herein has a flag of magnitude 3 with a confidence level of 0.4 and a second flag of magnitude 2 with a confidence level equal to 0.6. The fuzzy values of the two flags have 16 components, and on being merged a fuzzy flag is obtained having 16 components. In this example it is aggregated by the maximum operator.

FIG. 15 shows an example of fault flag merging performed by the inference engine 820 with a fuzzy belonging function (such as that shown in FIG. 9) and with fuzzy rules as set out in the table below.

| Merged Flag | | Flag 1 | | | | |
|---|---|---|---|---|---|---|
| | | "−1" | "0" | "1" | "2" | "3" |
| Flag 2 | "−1" | "−1" | "−1" | "−1" | "−1" | "−1" |
| | "0" | "−1" | "0" | "0" | "0"/"1" | "1" |
| | "1" | "−1" | "0" | "1" | "1" | "2" |
| | "2" | "−1" | "0"/"1" | "1"/"2" | "2"/"3" | "2"/"3" |
| | "3" | "−1" | "1" | "2" | "2"/"3" | "3" |

An example is described at the instant in question (FIG. 15) showing a first flag of magnitude 2 with a confidence level of 1 and simultaneously a magnitude of 3 with a confidence level of 0.8. A second flag is of magnitude 3 with a confidence level of 1, while the other magnitudes are inactive. The fuzzy rules given in the above table give a merging result that constitutes a flag of magnitude 3, with a confidence level of 0.9, and a flag of magnitude 2 with a confidence level of 0.1.

The defuzzyfication module 830 produces a nonfuzzy value on the basis of the previously-produced fuzzy value. In the scenario shown in FIG. 13, the mean of the maximums (MM) is used to obtain a nonfuzzy merged flag. In the example shown, the magnitude is of value 2 and the confidence level is 0.85. In the scenario shown in FIG. 14, two alternative possibilities are used, and these are shown in FIG. 16. The first possibility is the center of gravity method (CG), which leads to a magnitude of 2 with a confidence level of 0.8, and the second possibility is the method of taking the mean of the maximums, which leads to a magnitude of 2 with a confidence level of 1.

The invention finds applications in fields other than that described herein, where the complex system in question is a rocket engine.

A first example constitutes a process for decision making in order to generate a warning concerning a natural phenomenon such as flooding. The complex system is constituted by a region, its atmosphere, its water sources, and its water tables.

A first piece of state information may relate to meteorological observations associated with a confidence flag, and expected rainfall as deduced from the meteorological observations, in association with its confidence flag.

A second piece of state information may relate to the level of a water table, associated with its confidence flag.

A third piece of state information may relate to wind direction, associated once more with a confidence flag.

The failure described herein is flooding, and the failure information is associated with a confidence level that is produced using the principles of the invention.

A second example relates to a process for giving an epidemiological warning, e.g. concerning flu. The complex system is a human population.

A first piece of state information relates to the (high, medium, or low) level of propagation of flu, and it is associated with a confidence level.

A second piece of state information relates to the (high, medium, or low) vulnerability of people at risk (e.g. the elderly), and it is associated with a confidence level. It should be recalled that such vulnerability varies as a function of other parameters, such as the weather, for example.

A third piece of state information relates to the (very good, satisfactory, or poor) effectiveness of the available treatments, and once more it is associated with a confidence level.

In this example, failure information means that the usual measures for protecting the population are not sufficient, and it is associated with a confidence level. On the basis of this information, the authorities might possibly be caused to take special measures for protecting the population.

Another example relates to a nuclear industry application, and more precisely to decision making concerning maintenance in an installation of the nuclear power station type.

A first piece of state information relates to a thermal shock level or to a level integrated over time representative of a cumulative thermal shock level, where thermal shocks are the result of transients. This first piece of information is associated with a confidence flag.

A second piece of information represents a level in the degradation of the ductility of metal, which level is the result of calculations performed on models making use of observations, and it is associated with a confidence flag.

Failure information relates to failure of the monitored system and is associated with a confidence level, serving to order maintenance actions.

The invention is described with reference to embodiments that are not limiting, and it extends to any variants within the limits of the scope of the claims.

The invention claimed is:

1. A data processor system for monitoring a complex system,
    the processor system configured to receive a plurality of pieces of state information and to merge at least the pieces of state information into a piece of failure information, at least one of the pieces of state information being associated with a confidence flag, and the piece of failure information also being associated with a confidence flag,
    wherein the merging is performed by implementing a fuzzy logic technique to produce the piece of failure information while taking account of the respective confidence flags of the pieces of state information and to produce the confidence flag associated with the failure information, and
    wherein the pieces of state information are received in state messages including an identity of a subsystem or of a component.

2. A data processor system according to claim 1, wherein exact rules are used for combining the pieces of state information, or fuzzy rules are used for combining the pieces of state information.

3. A data processor system according to claim 1, wherein the state information is subjected to fuzzyfication with an exact belonging function, a fuzzy belonging function, a belonging function in which one class is strengthened relative to the others, or a belonging function in which a magnitude of the state information is cross-tabulated with a confidence level.

4. A processor system according to claim 1, wherein inference is performed using Mamdani's method or Larsen's method.

5. A processor system according to claim 1, wherein the rules are aggregated with a maximum operator or a minimum operator.

6. A data processor system according to claim 1, wherein defuzzyfication is performed using a method of averaging maximums or center of gravity method.

7. A data processor system according to claim 1, wherein the pieces of state information are received in state messages including a time stamp.

8. A data processor system according to claim 1, wherein each piece of state information is associated with a magnitude.

9. A data processing method for monitoring a complex system, the method comprising:
- receiving pieces of state information and merging at least one of the pieces of state information into a piece of failure information, at least one of the pieces of state information being associated with a confidence flag, and the piece of failure information also being associated with a confidence flag;
- wherein the merging is performed by implementing a fuzzy logic technique to produce a piece of failure information while taking account of the respective confidence flags of the pieces of state information and to produce the confidence flag associated with the piece of failure information and
- wherein the pieces of state information are received in state messages including an identity of a subsystem or of a component.

* * * * *